United States Patent [19]
Harris et al.

[11] Patent Number: 6,116,842
[45] Date of Patent: Sep. 12, 2000

[54] TRANSFER CAR FOR A CONVEYOR SYSTEM

[76] Inventors: Richard D. Harris, 9252 Diamond Point Dr., Indianapolis, Ind. 46236; Achie B. Russell, 5087 N. County Rd., 550 W., Connersville, Ind. 47331

[21] Appl. No.: 09/165,397

[22] Filed: Oct. 2, 1998

[51] Int. Cl.[7] .................................. B60P 1/00; B65F 1/00; B65F 3/00
[52] U.S. Cl. ............................................................ 414/529
[58] Field of Search .................................. 198/574, 586, 198/782; 414/529

[56] References Cited

U.S. PATENT DOCUMENTS

| | | |
|---|---|---|
| 3,690,435 | 9/1972 | King et al. . |
| 3,913,766 | 10/1975 | Wentz . |
| 3,934,732 | 1/1976 | Chambers . |
| 4,015,680 | 4/1977 | Pircher et al. . |
| 4,139,087 | 2/1979 | Westhoff et al. . |
| 4,210,237 | 7/1980 | Gram . |
| 4,312,540 | 1/1982 | Thompson . |
| 4,353,457 | 10/1982 | Haley ....................................... 198/574 |
| 4,478,329 | 10/1984 | Heiz ......................................... 198/574 |
| 4,813,526 | 3/1989 | Belanger . |
| 4,856,956 | 8/1989 | Zur . |
| 5,280,902 | 1/1994 | Helmstadter . |
| 5,351,809 | 10/1994 | Gilmore et al. . |
| 5,525,025 | 6/1996 | Ootmar Ten Cate et al. ......... 414/529 |
| 5,555,968 | 9/1996 | Seefeldt et al. . |
| 5,636,727 | 6/1997 | Neri et al. ............................... 198/574 |

*Primary Examiner*—Christopher P. Ellis
*Assistant Examiner*—Joe Dillon, Jr.

[57] ABSTRACT

A transfer car is configured to travel along an aisleway between arrays of conveyor sections. The transfer car includes a chassis that carries ground engaging wheels and a transfer conveyor assembly movably supported on said chassis. A transfer motor drives a rack and pinion mechanism that translates the conveyor assembly from side-to-side over the edges of the transfer car. Thus, with the transfer conveyor assembly in its neutral position centered over the chassis, the transfer car maintains a wide gap between the car and the ends of the conveyor array to prevent injury to persons standing near the gap. The transfer conveyor assembly can be shifted to one side adjacent an end of a conveyor section to receive items from that section, and then shifted to the opposite side adjacent an end of an opposing conveyor section to discharge the items.

16 Claims, 6 Drawing Sheets

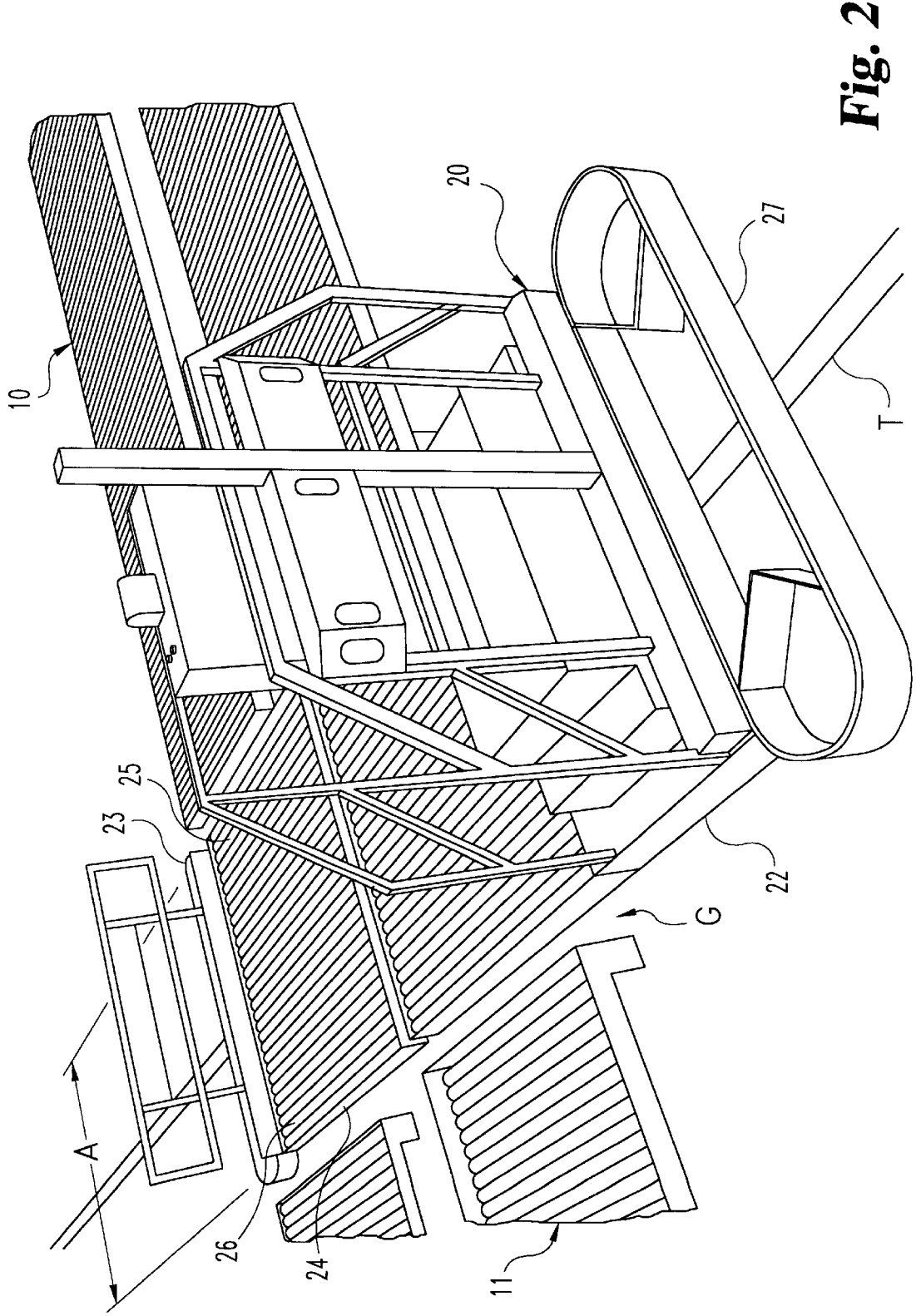

TRANSFER CAR FOR A CONVEYOR SYSTEM

BACKGROUND OF THE INVENTION

The present invention concerns conveyor systems having a first array of supply conveyors and a second array of receiving conveyors. More particularly, the invention concerns a transfer car that travels between the array of supply and receiving conveyors to transfer items from one array to another.

In modern article handling facilities, such as factories, warehouses and distribution centers, it is a frequent practice to have an array of supply conveyors and a second separate array of receiving conveyors. The supply conveyors can receive packages or products from a manufacturing and/or assembly line, or from a product sorting system. The receiving conveyors can accept the products at a number of different conveyor sections corresponding to different outgoing locations. For instance, in a warehousing scenario, the supply conveyors can accept a variety of products from a sorting network. The receiving conveyors can correspond to particular destinations to which the sorted products will be sent. Likewise, in a factory setting, newly manufactured product can be accumulated on several supply conveyors and then subsequently transferred to destination specific receiving conveyors.

In warehouse or distribution systems involving a limited number of products or a minimal number of outgoing destinations, certain automated conveyor systems are acceptable that automatically switch products from one supply conveyor section to another outgoing conveyor section. However, where a number of products are being sorted and distributed, and/or a number of outgoing locations are being serviced, the number and frequencies of transfers between incoming and outgoing conveyor sections is so large that relying upon direct mechanical transfer between input and output is not feasible. In these instances, it is a frequent practice to utilize one array of supply conveyors and a separate array of receiving conveyors that are separated by an aisleway. A transfer car then traverses the aisleway between the two conveyor arrays. Products can be transferred to a supply conveyor section to the transfer car, which then carries the products to one of the receiving conveyor sections for subsequent transport.

In a typical application, the transfer cars are automatic, meaning that they can be programmed to follow a predetermined sequence between supply conveyor sections and receiving conveyor sections. In some cases, the automatic transfer cars are equipped with bar code readers or scanners that scan labels on the products to determine where a particular product is intended to go. In a production facility, the automated transfer car can be programmed to extract newly manufactured product from machine specific supply conveyor sections and deliver the product to destination specific receiving conveyor sections.

One such approach is illustrated in FIG. 1. An array of supply conveyor sections 10 are oriented across an aisleway A from an array of receiving conveyor sections 11. Although only one conveyor in each section is depicted, it is understood that in a typical set up a plurality of such conveyor sections would be included. Moreover, the conveyor sections may be dispersed at various locations throughout the building or warehouse. Regardless of the configuration, however, the aisleway A is maintained between the supply and receiving conveyor arrays.

In this typical installation, a transfer car 15 is provided that traverses the aisleway A between the conveyor arrays. The transfer car in one application includes a transfer conveyor assembly 16 mounted on the moveable car. As shown in FIG. 1, the transfer conveyor assembly is aligned parallel with the conveying direction C of the two conveyor arrays. Thus, in a typical operation, a product P is conveyed by supply conveyor section 10 toward the transfer car 15. The transfer conveyor assembly 16 on the transfer car 15 can be powered or simply freewheeling to accept the product P. As shown in the figure, the receiving conveyor section 11 can be directly across from the supply conveyor section 10, so that the product P can be transferred directly to the receiving conveyor section 11. However, typically the transfer car 15 would travel along the aisleway A to another receiving conveyor section. At this point, the package is discharged from the transfer car transfer conveyor assembly 16 onto the receiving conveyor section 11. In some cases, the transfer car 15 is manually operated, meaning that a human operator stands at one end of the transfer car and directs its operation. In other typical installations, the transfer car 15 travels automatically along the aisleway A. Specifically, a track T is used to guide the path of the transfer car 15. In some instances, the track T is formed in the floor of the building, in the form of a railroad track or a continuous slot. Appropriate features on the transfer car 15 allow the car to follow the track T. In other cases, the track T can be electronic, with appropriate sensing devices on the transfer car 15 to guide the car between the opposing conveyor sections 10 and 11.

Automatic transfer cars have vastly simplified the process of transferring products P from one point to another in a factory, warehouse or distribution center. However, as with any powered or driven vehicle, safety concerns continuously arise. Various industrial safety regulations require specific safety features on automated equipment of this type. For instance, flashing lights and sound alerts may be mounted on the transfer car as an apparent warning to workers that may be passing through the aisleway A. More sophisticated, and consequently much more expensive, pathway sensors determine whether an object or a person is in the aisleway, at which point the transfer car 15 is directed to stop.

Of course, as with many safety features, they are not completely foolproof, meaning that injuries by use of the transfer car 15 can result in ways not accounted for by the safety features. One specific problem that arises frequently with respect to automated transfer cars arises at the shear point S between the transfer car and the conveyor sections. Specifically, the shear point S constitutes the narrow gap that exists between the sides of the transfer car and the ends of the opposing conveyor sections. This gap must, by necessity, be relatively small so that the products P can be easily conveyed from conveyor section to transfer car and back to conveyor section without hanging up. In addition, space concerns may necessitate a tight clearance between the sides of the transfer car and the ends of the conveyor sections. In a typical installation, the shear point S is only about 1.5 inches wide.

One problem that arises is that workers standing adjacent one end of the transfer car may not be aware of an oncoming transfer car and can have a body part trapped or pinched at the shear point S as the transfer car passes. Many safety features are unable to prevent this type of occurrence. Photoelectric pathway sensors may not sense the presence of a person at the side of a transfer car or approaching from the side of the transfer car. A lack of attention may make the visible and audible warnings ineffective.

While the automated transfer car is a great benefit to product distribution, it still carries an inherent safety risk.

Thus far, no known automated transfer cars adequately account for this risk. The danger can be reduced if the shear point S is widened at the opposite sides of the transfer car 15. However, this physical modification to the transfer car can make it impossible to transfer product P to and from the transfer car. While this approach may work for large products, it is not acceptable for smaller products that may fall into the enlarged space between transfer car and conveyor section. The same problem is inherent with sheet products that may not rest entirely flat on the conveyor sections during transfer.

There is therefore a need for a transfer car that retains the capability of the prior art systems while avoiding the perils associated with the usage of automated vehicles of this type. In other words, there is a need for a transfer car that eliminates the dangerous shear point S while maintaining the product transfer surface of the transfer car as close to the ends of the conveyor sections as possible.

SUMMARY OF THE INVENTION

These needs are addressed in the present invention by a transfer car that includes a mobile chassis and a transfer conveyor assembly movably mounted on the chassis. The mobile chassis includes a plurality of drive wheels and a guide mechanism for navigating the transfer car in a direction of travel through an aisleway between opposing arrays of conveyor sections. The transfer car can include an automatic control system for stopping and starting the transfer car at various conveyor sections and for directing the loading and unloading of product from the transfer car.

The transfer conveyor assembly is configured to receive product from one conveyor section and transfer that product to another conveyor section. In one embodiment, the transfer conveyor assembly includes a powered transfer conveyor assembly. For example, the powered section can include a drive belt arrangement that drives a plurality of conveyor rollers to propel product onto and off the transfer car.

In one feature of the invention, the transfer conveyor assembly, or more specifically the powered transfer conveyor assembly, can be translated side-to-side, or transverse to the direction of travel of the transfer car. In accordance with certain aspects of the invention, the transfer car defines right and left edges that leave a significant gap between the transfer car and the ends of the conveyor sections as the transfer car travels along the aisleway. In other terms, the transfer car has a width that is significantly less than the width of the aisleway; thereby eliminating the shear points commonly associated with prior art transfer cars. The powered transfer conveyor assembly has a neutral position substantially centered on the chassis of the transfer car so that no portion of the conveyor section extends beyond the side edges of the car. When the transfer car is moving between conveyor sections, the conveyor section remains within the envelope of the transfer car to preserve the wide gap at the sides of the car.

When the transfer car is adjacent a supply or receiving conveyor section, the powered transfer conveyor assembly is shifted laterally beyond the corresponding side edge of the transfer car. With this movement, the transfer car conveyor section is directly adjacent the end of the particular supply/receiving conveyor section to permit a smooth transition of product therebetween. In other words, the transfer car conveyor section is shifted to one side to close the gap between the transfer car and the end of the conveyor section. Once the product has been moved onto or off the transfer car conveyor section, that conveyor section is shifted back to its neutral position on the chassis.

In a use of the transfer car according to the present invention, the car moves along the aisleway to a particular supply conveyor section. When the car arrives at the appointed location, the transfer conveyor assembly of the transfer car is shifted laterally toward the supply conveyor section. The product is then conveyed from the supply conveyor section onto the transfer conveyor assembly of the transfer car. The powered conveyor assembly is stopped when the product is securely positioned, at which point the conveyor assembly is shifted back to its neutral position on the transfer car chassis.

With the product on board, the transfer car travels along the aisleway until it reaches a designated receiving conveyor section. At that point, the conveyor assembly of the transfer car is shifted across the other side of the chassis toward the end of the receiving conveyor section. The powered conveyor assembly is energized to propel the product off the transfer car conveyor section and onto the receiving conveyor section. After the product has been discharged, the transfer car conveyor section can be returned to its neutral position.

In one embodiment of the invention, the transfer conveyor assembly of the transfer car includes a motor to drive the powered conveyor section and a separate transfer motor to translate the assembly from side-to side. This transfer motor can power a rack and pinion assembly disposed between the movable frame of the transfer conveyor assembly and the relatively stationary chassis of the transfer car. In one specific embodiment, two racks can be mounted at forward and rear positions of the chassis, while a corresponding pair of pinion gears can be mounted to the opposite ends of a pinion shaft powered by the transfer motor. Rotation of the pinion shaft causes the pinion gears to rotate. As the pinion gears rotate, they travel along the corresponding rack in conventional fashion, thereby moving the transfer conveyor assembly according to the direction of rotation of the pinion gears.

The timing of operation of the conveyor motor and the transfer motor can be automatically controlled using known microcontrollers or microprocessors. Preferably, the conveyor motor is de-energized when the transfer conveyor assembly itself is translated from the neutral position to one or the other side.

It is one object of the invention to provide a transfer car that virtually eliminates the shear points between the car and conveyor sections. It is a further object to provide a transfer car that can be automatically controlled and easily guided through the aisleway between arrays of conveyor sections.

One benefit of the invention is that the shear points are eliminated without sacrificing continuity in transfer path between conveyor section and transfer car. A further benefit resides in features of the invention that allow it to maintain a conventional height for use with standard article transfer conveyor sections.

Other object and benefits of the invention will become apparent upon consideration of the following written description and accompanying figures.

DESCRIPTION OF THE FIGURES

FIG. 2 is a perspective view of a transfer car with a conveyor system in accordance with one embodiment of the present invention.

DESCRIPTION OF THE PREFERRED EMBODIMENT

Figure 1:
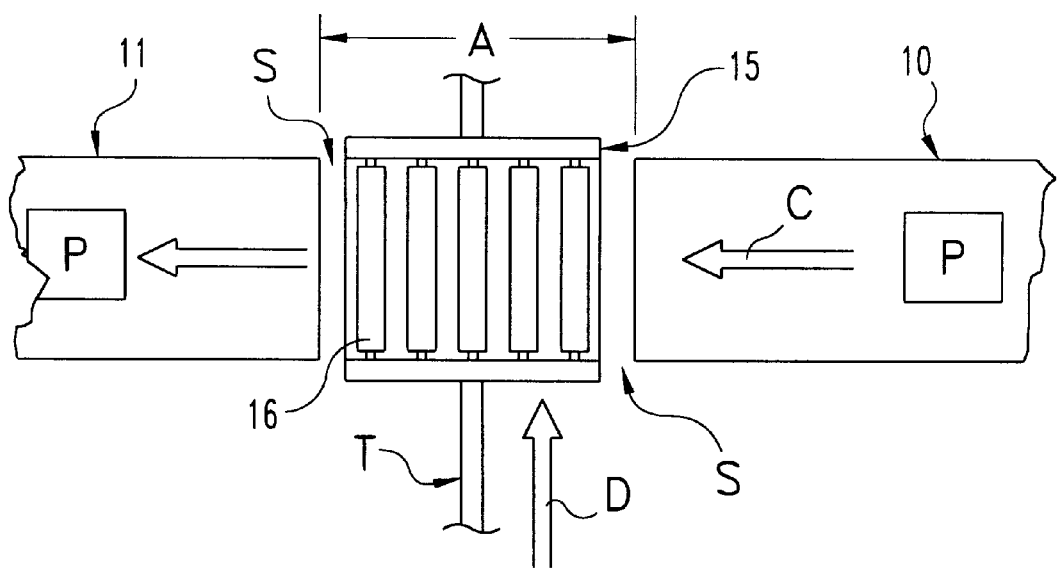
FIG. 1 is a diagrammatic plan view of a conveyor system using a transfer car as known in the prior art.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

A transfer car 20 is illustrated in FIG. 2 that is configured to traverse the aisleway A between the supply conveyor sections 10 and the receiving conveyor sections 11. In the illustrated embodiment, the transfer car 20 follows a track T, which can be of a conventional mechanical or electrical design. The transfer car 20 includes a chassis 22 that carries the ground engaging driven wheels as well as any guide mechanism that functionally mates with the track T. The chassis 22 has a right edge 23 that is positioned adjacent the supply conveyor section 10 and a left edge 24 that is adjacent the receiving conveyor section 11.

The chassis 22 supports a transfer conveyor assembly 25 to convey product to and from the transfer car 20. The transfer conveyor assembly can be a roller, belt or chain type, or of any other known conveyor design. In the specific illustrated embodiment, the transfer conveyor assembly 25 includes a plurality of rollers 26. The transfer conveyor assembly 25 can be powered or rely on gravity feed, depending upon the nature of the transfer car 20. In the illustrated embodiment, the transfer conveyor assembly 25 is powered so that the individual rollers 26 are rotated to receive and discharge a product P. As shown in FIG. 2, the transfer car 20 includes one safety feature in the form of bumpers 27 at the front and back of the car. The bumpers can provide an initial level of safety should the transfer car 20 strike an object in the aisleway A.

Figure 3A:
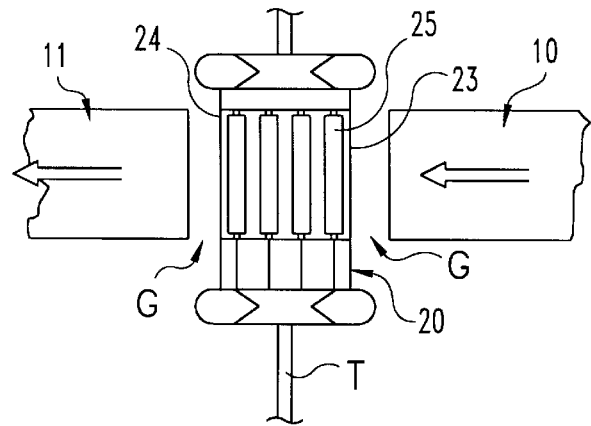
FIGS. 3a–3c is a diagrammatic plan view of the transfer conveyor shown in FIG. 2 in its various operative positions.

In accordance with one feature of the present invention, the transfer conveyor assembly 25 is moveably mounted to the chassis 22 so that the assembly 25 can be translated side-to-side on the transfer car 20. This feature is illustrated best in FIGS. 3a–3c. When the transfer car 20 travels along the track T between conveyor sections, the transfer conveyor assembly 25 is in the position shown in FIG. 3a. Specifically, the transfer conveyor assembly 25 is centered at a neutral position between the right edge 23 and the left edge 24 of the chassis 22. In this position, the transfer car 20, and more specifically the transfer conveyor assembly 25 leaves a large gap G between the supply conveyor section 10 and receiving conveyor section 11. Preferably, this gap G is large enough to avoid trapping a limb of a person between the transfer car 20 and one of the conveyor sections 10, 11. In one specific embodiment, this gap G can be about nine inches.

Figure 3B:
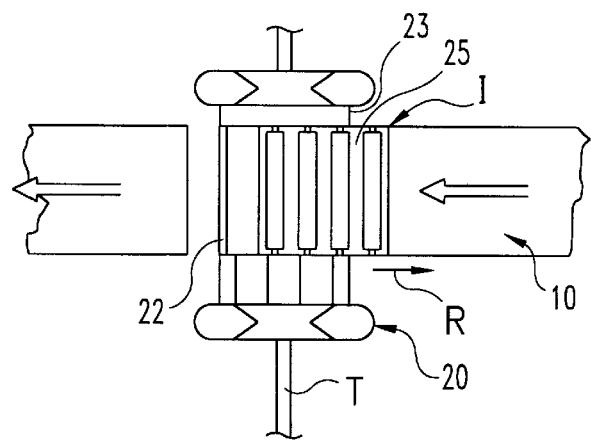
Figure 3C:
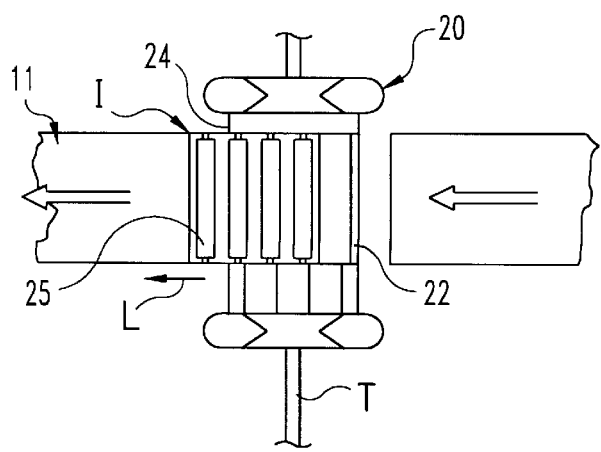

Of course, as discussed above, a gap G of this extent can cause a product or package to hang up when it is being transferred between one of the conveyor sections 10, 11 and the transfer conveyor assembly 25 of the transfer car 20. Specifically, a package that is sufficiently small or a warped sheet of material may fall into the gap G, thereby stalling the entire conveyor system. This problem is addressed in the present invention by providing for lateral movement of the transfer conveyor assembly 25 relative to the transfer car chassis 22. As depicted in FIG. 3b, the transfer conveyor assembly 25 can be moved to the right in the direction of the arrow R beyond the right edge 23 of the chassis 22. In this position, the side of the transfer conveyor assembly 25 is directly adjacent the supply conveyor section 10 at the intersection I. The lateral movement of the transfer conveyor assembly 25 can be calibrated so that the intersection I is as small as possible. Likewise, as shown in FIG. 3c, the transfer conveyor assembly 25 can be moved to the left in the direction of the arrow L so that the left side of the transfer conveyor assembly 25 abuts or is directly adjacent to the end of the receiving conveyor section 11. In this position, a product on the transfer conveyor assembly 25 can be smoothly transitioned to the receiving conveyor section 11. With this feature, then, the transfer car 20 avoids the dangerous shear points S common with transfer cars of the prior art such as transfer car 15 shown in FIG. 1. At the same time, this feature allowing lateral movement of the transfer conveyor assembly 25 provides for a smooth transfer of product to and from the transfer car 20.

Figure 4:
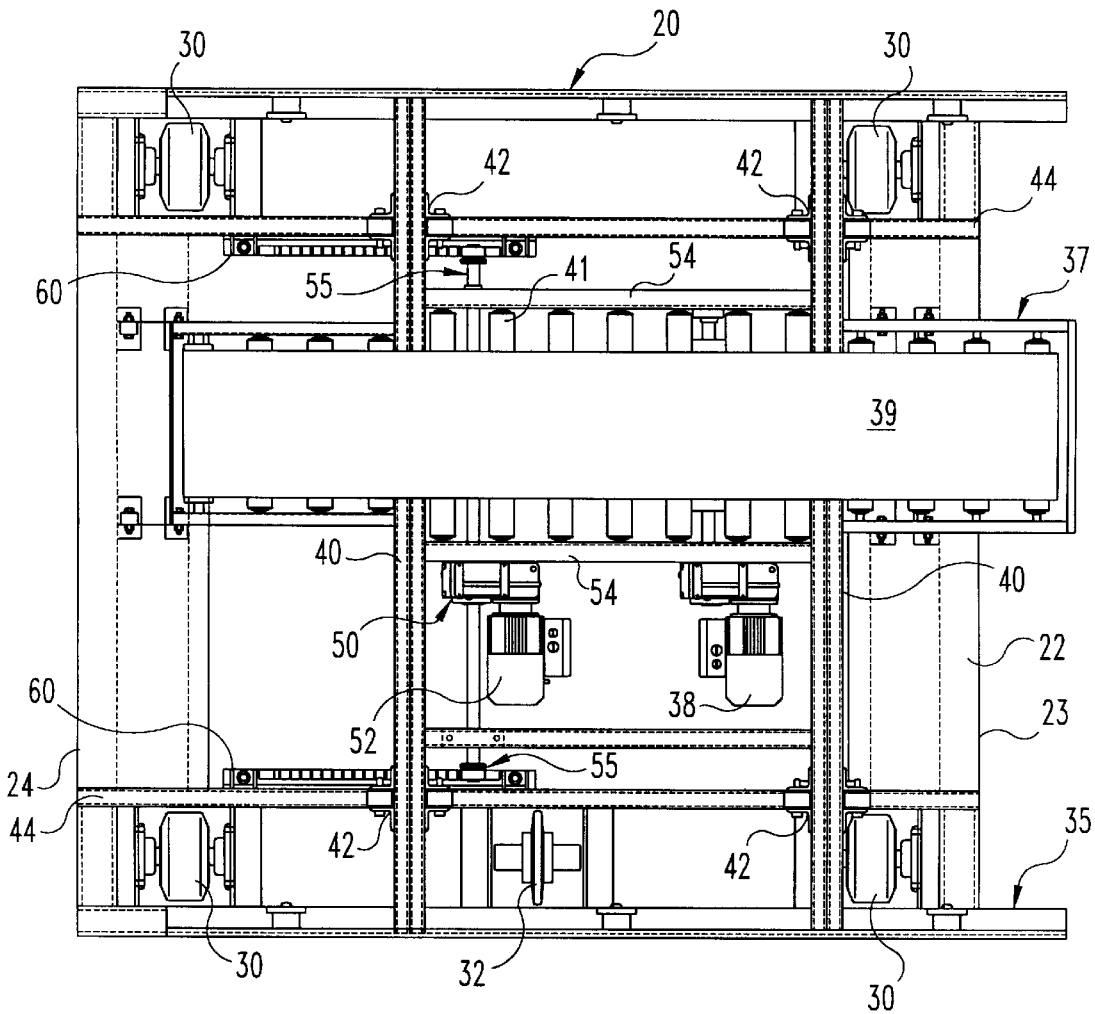
FIG. 4 is a top elevational view of the transfer car shown in FIG. 2 with an upper portion of the transfer car removed for clarity.

Details of the transfer car 20 are shown in FIGS. 4–8. In the view of FIG. 4, the rollers 26 of the transfer conveyor assembly 25 have been removed to expose a top plan view of the chassis 22 and certain structural elements of the transfer conveyor assembly 25. The transfer car 20 includes a chassis 22 having a right edge 23 and a left edge 24. The chassis 22 carries means for propelling or conveying the car along the aisleway A. In one specific embodiment, the chassis supports a plurality of wheels 30, which can be idler wheels or driven by independent motors (not shown). As is known in the field, the transfer car can be self-propelled or externally driven. The transfer car also includes a guide wheel 32 that is configured to engage the track T shown in FIG. 3a. In the specific illustrated embodiment, the transfer car 20 is a track-guided apparatus. Of course, the guide wheel 32 can be eliminated if an alternative guidance system is provided, such as an optical sensor system.

Figure 5:
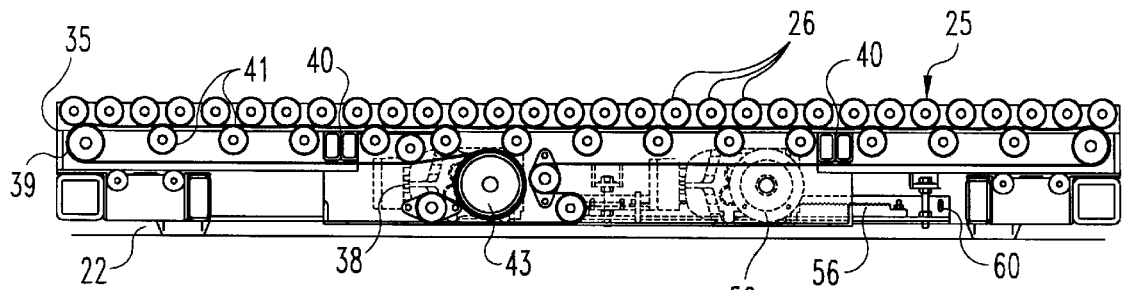
FIG. 5 is a side elevational view of the transfer car shown in FIG. 2, with the upper roller section retained in its operating position.
Figure 6:
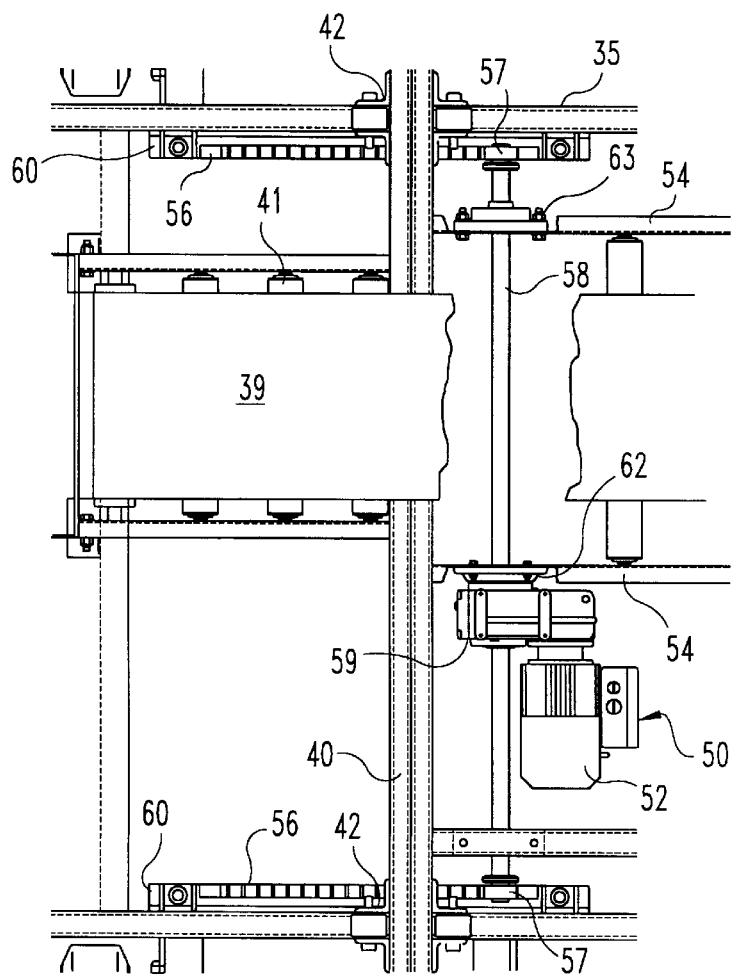
FIG. 6 is an enlarged top elevational view of a portion of the transfer car shown in FIG. 4.
Figure 8:
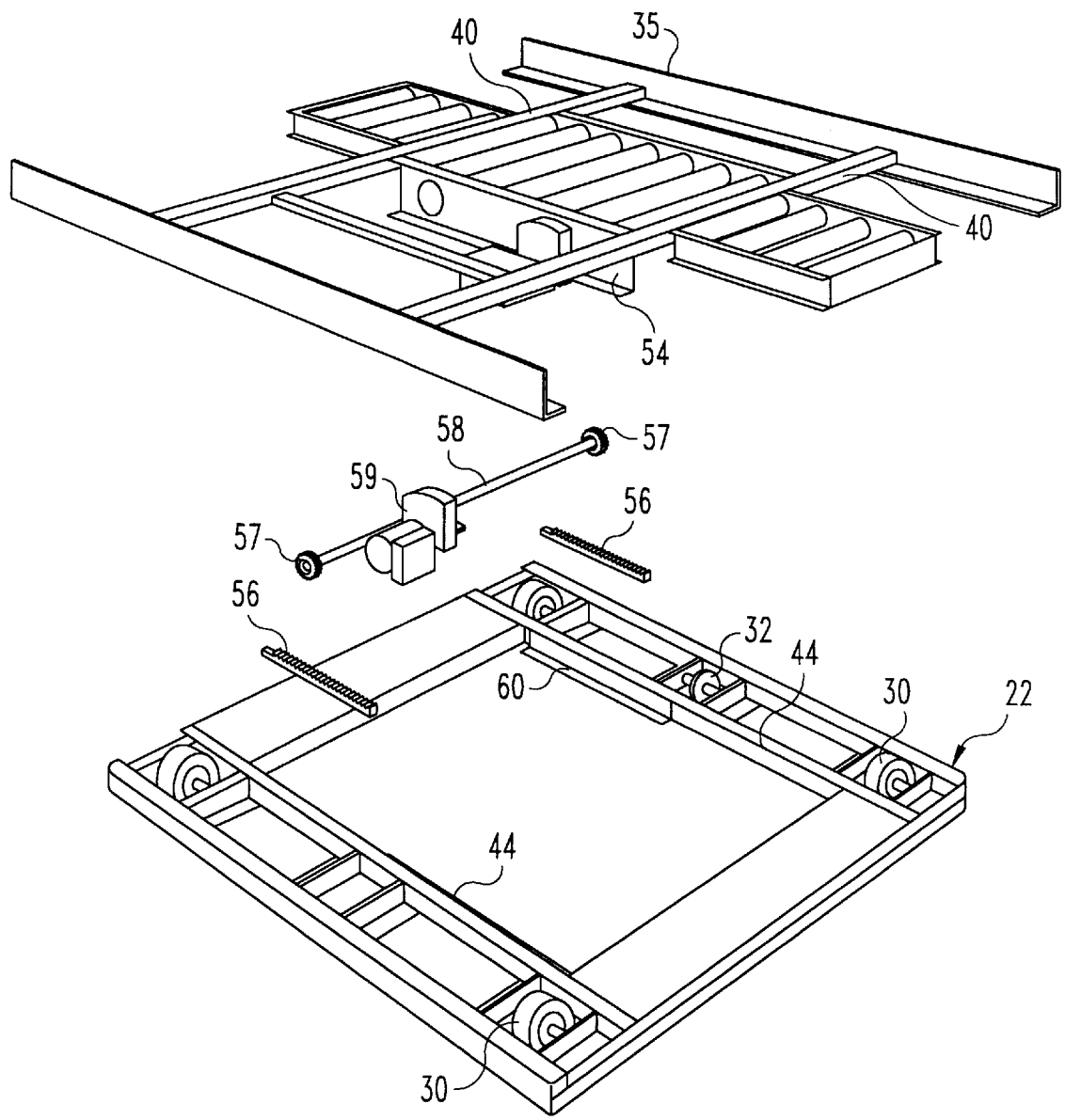
FIG. 8 is an exploded perspective view of components of the transfer car shown in FIG. 2.

The transfer conveyor assembly 25 includes a frame 35 that is supported by the chassis 22. The frame supports an article transfer component in the form of a drive belt assembly 37 that can be of a known design to drive conveyor rollers 26 forming part of the transfer conveyor assembly 25. For example, the drive belt assembly 37 can include a belt motor 38 that drives a continuous belt 39. As depicted in FIGS. 4 and 5, the belt 39 passes around a plurality of rollers 41. A belt drive wheel 43 is mounted to the axle of the motor 38 and the belt 39 is wound around the drive wheel 43 to provide the motive force to rotate the continuous belt 39. As is known in the art, the drive belt 39 can be fed in serpentine fashion through a series of tensioning rollers, while the remaining rollers can provide support for the belt 39 as it traverses underneath the conveyor rollers 26 (FIG. 2). Friction between the moving belt 39 and the rollers 26 cause the rollers to rotate, thereby conveying products across the transfer conveyor assembly 25.

The frame 35 includes a pair of cross beams 40 that extend longitudinally across the length of the transfer car 20. The cross beams 40 support a plurality of transfer wheels 42 that are configured to travel along a guide beam 44 that is part of the chassis 22. In other words, the frame 35 for the transfer conveyor assembly 25 is translationally supported by the transfer wheels 42 on the guide beam 44. In the illustrated embodiment, four sets of transfer wheels 42 are mounted to the crossbeams 40; however, it is understood that other forms of moveable, or preferably frictionless, engagement with the chassis 22 of the transfer car 20 is contemplated. For example, a skid can be mounted to the crossbeams 40 in contact with the guide beam 44. One feature of the invention is that the frame 35 for the transfer conveyor assembly 25 is capable of freely translating between the left and right edges 23, 24 of the chassis. Consequently, the mounting of the frame 35 to the chassis must accommodate this particular motion.

In order to accomplish this side-to-side translation of the transfer conveyor assembly 25, the transfer car 20 includes a transverse drive assembly 50. Details of the drive assembly are shown in the enlarged view of FIG. 6 and in the exploded perspective view of FIG. 8. In the preferred embodiment, the transverse drive assembly 50 includes a drive motor 52 that is supported by one of a pair of inner beams 54. The inner beams 54 form part of the frame 35 of the moveable transfer conveyor assembly 25. Specifically, the inner beams 64 are fastened between the crossbeams 40 so that the inner beams 54 are oriented perpendicular to the path of travel to the transfer car 20. The inner beams 54 are also configured to support some of the rollers 41 forming the drive belt assembly 37.

The transverse drive assembly 50 also includes a rack and pinion mechanism 55 that provides the motive force to translate the transfer conveyor assembly 25 from side-to-side. The mechanism 55 includes a rack 56 that is mounted to the chassis 22 of the transfer car 20. In the illustrated embodiment, each rack 56 is supported on an angle iron 60 that is affixed to a corresponding one of the guide beams 44. Of course, other means for supporting the rack 56 are contemplated provided that the rack 56 is engaged to the relatively stationary chassis 22.

The rack and pinion mechanism 55 also includes a pair of pinion gears 57 mounted at the opposite ends of a pinion shaft 58. In the preferred embodiment, the pinion shaft 68 is rotatably driven by the motor 52 through a transmission 59. The motor 52 and associated transmission 59 can be a variety of commercially known models.

The drive motor 52 and transmission 59 can be supported on one of the inner beams 54 by a motor mount 62. The shaft 58 can be supported at the other inner beam 54 by a bearing mount 63. Of course, both motor mount 62 and the bearing mount 63 permit free rotation of the shaft 58.

Figure 7:
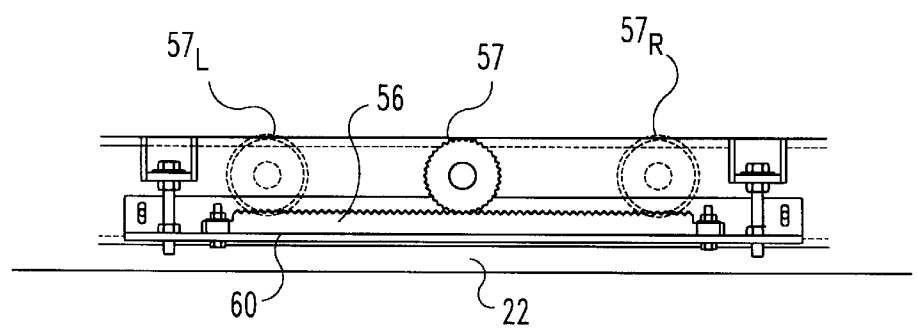
FIG. 7 is an enlarged side elevational view of a rack and pinion mechanism used with the transfer car used in accordance with one embodiment of the present invention.

As shown in FIG. 7, the rack and pinion mechanism 55 is configured so that rotation of the drive motor 52 and shaft 58 causes rotation of the pinion gear 57. As the pinion gear rotates, the teeth of the gear engage the teeth of the rack 56 so that the gear translates along the rack. As shown in the figure, the pinion gear can move from one end of the rack 56 at position $57_R$ to the opposite end of the rack at position $57_L$. The movement of the pinion gear between those two positions corresponds to the side-to-side movement of the transfer conveyor assembly 25 depicted in FIGS. 3b and 3C.

In the illustrated embodiment, a rack and pinion mechanism 55 is utilized in which the drive motor 52 is mounted on the moveable component, namely the transfer conveyor assembly 25. Alternatively, the drive member can be mounted to the relatively stationary chassis 22 of the transfer car 20, with the rack 56 being mounted to the moveable components, transfer conveyor assembly 25. Similarly, in the illustrated embodiment, drive motor 52 provides rotary motion to the pinion gear 67. It is contemplated that an alternative transverse drive assembly can be utilized in which the rack 56 is the driven component, being translated side-to-side. In this case, the pinion gear 57 would be stationary but rotatably mounted to either the chassis 22 or the frame 35. It is further contemplated that a relative drive mechanism other than the illustrated rack and pinion mechanism 55 can be utilized. For instance, a drive belt can be engaged between the stationary chassis 22 and the moveable frame 35 so that rotation of the belt accomplishes translation of the transfer conveyor assembly 25.

In the preferred embodiment, the motor 38 driving the conveyor rollers 26 is independent of the transfer motor 52 that translates the conveyor assembly 25 from side-to-side. Each motor can be controlled electronically using a conventional microcontroller or microprocessor. It is contemplated that the automatic controller that guides the movement of the transfer car 20 between conveyor arrays can be adapted to control the operation of the two motors 38 and 52.

It is also contemplated that the motors will not be energized at the same time—i.e., the drive motor 38 will be shut off while the transfer motor 52 shifts the conveyor assembly 25 to and from the neutral position. Likewise, when the drive motor is operating to receive or discharge product from the conveyor assembly 25, the transfer motor 52 will be shut off. In one modification of the preferred embodiment, a single motor can be used to drive both mechanisms, namely the powered roller conveyor and the rack and pinion mechanism. In this instance, an appropriate transmission can be provided that can be switched between the two operating systems.

The above features of the illustrated embodiment permit transfer car 20 to have a width between its right edge 23 and left edge 24 that is significantly smaller than the width of the aisleway A (see FIG. 2). For instance, in a specific embodiment, the gap G between each edge of the transfer car 20 and the corresponding ends of the conveyor sections can be about nine inches. Thus, the transfer conveyor assembly 26 is configured to translate nine inches to the right and nine inches to the left.

Referring to FIG. 7, this lateral translation corresponds to the distance between the centers of the pinion gear 57 and the translated positions of the pinion gear at positions $57_R$ and $57_L$. In order to achieve ±9 inch translation, the rack 56 must be at least eighteen inches long. With this much greater clearance at the gap G, there is a significantly reduced likelihood that a person's limb can be pinched between a moving transfer car 20 and a supply or receiving conveyor section 10, 11. Of course, in operation, the moveable transfer conveyor assembly 25 will not be moved to either side until the transfer car 20 is properly positioned at an end of one of the conveyor sections. Various types of photo or electric sensors can be implemented to determine when the transfer car is properly oriented. In addition, the transfer car 20 can include programmable features that will move the transfer car and its components in predetermined patterns.

One significant benefit provided by the transfer car 20 of the present invention is that the moving components of the transfer car fit within an envelope of a predetermined height. In the preferred embodiment, the height between the base of the chassis 22 and the top of the rollers 26 of the transfer conveyor assembly 25 is about twelve inches. Maintaining this height envelope is important so that the transfer car 20, and particularly the transfer conveyor assembly 25, can be properly oriented with respect to a conventional conveyor section. In other words, if the moving components of the transfer car 20 occupy an envelope that is too high, the products P cannot be transferred from the supply conveyor section 10 to the transfer car 20. Thus, the integration of the transfer drive assembly 50, and the belt drive assembly 37 within the transfer car 20 allow for a minimum height for easy use with a standard conveyor system.

In the illustrated embodiment, the transfer conveyor assembly 25 is translated in directions R and L that are perpendicular to the direction of travel D of the transfer car 20 along the aisleway A. The principles of the present invention can be applied to translate the assembly at non-perpendicular orientations as well. Moreover, the distance of travel at one side can be greater than at the opposite side. This can be accomplished by shifting the rack and pinion mechanism, by providing sensors at predetermined limits of travel that de-energize the transfer motor 52, or by utilizing different pinion gears depending upon the direction of movement.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A transfer car for a conveyor system having a number of opposed conveyor sections each defining an aisleway between the ends of each of the opposing sections, comprising:
   a powered conveyor component defining an article transfer axis along which articles received from one of said conveyor sections are propelled;
   a chassis configured for traveling along the a track through the aisleways in a first direction; and
   translation means between said powered conveyor component and said chassis for translating said conveyor side-to-side relative to said chassis in a second direction non-parallel with said first direction.

2. The transfer car according to claim 1, wherein said translation means includes:
   a transfer motor; and
   a rack and pinion mechanism engaged between said chassis and said powered conveyor component and driven by said transfer motor.

3. The transfer car according to claim 2, wherein:
   said rack is mounted to said chassis;
   said pinion is driven by said transfer motor; and
   said transfer motor is mounted to said powered conveyor section.

4. A transfer car for a conveyor system having a number of opposed conveyor sections each defining an aisleway between the ends of each of the opposing sections, comprising:
   a chassis having a right edge and an opposite left edge;
   means associated with said chassis for propelling said transfer car in a first direction along a track through the aisleways between the opposed conveyor sections; and
   a transfer conveyor assembly movably mounted on said chassis including:
   an article transfer component defining a transfer axis that is non-parallel with said first direction, said transfer component further defining a width along said transfer axis that is less than a length across the aisleway between the ends of the opposed conveyor sections along said transfer axis, said transfer component configured for receiving articles from one of the opposed conveyor sections; and
   a drive mechanism operably connected to said transfer component to reciprocate said transfer component along said transfer axis between a first position in which said transfer component extends beyond said right edge adjacent an end of one of the opposed conveyor sections to a second position in which said transfer component extends beyond said left edge adjacent an end of another of the opposed conveyor sections.

5. The transfer car according to claim 4, wherein said article transfer component includes a plurality of elongated rollers supported on said assembly perpendicular to said transfer axis.

6. The transfer car according to claim 5, wherein said article transfer component includes a means for rotating said plurality of elongated rollers to propel articles on said transfer component.

7. The transfer car according to claim 6, wherein said means for rotating includes:
   a belt having a friction surface in contact with said plurality of elongated rollers; and
   a belt motor for rotating said belt.

8. The transfer car according to claim 4, wherein:
   said article transfer component includes a frame slidably mounted on said chassis; and
   said drive mechanism includes:
      a transfer motor mounted on said frame; and
      a translation mechanism operably coupled between said transfer motor and said chassis.

9. The transfer car according to claim 8, wherein said translation mechanism includes a rack and pinion mechanism.

10. The transfer car according to claim 9, wherein:
    said translation mechanism includes a pinion gear coupled to a said transfer motor; and
    said rack is mounted to said chassis.

11. The transfer car according to claim 8, wherein said article transfer component includes a powered belt conveyor section having a drive motor.

12. The transfer car according to claim 11, wherein said drive motor is independent of said transfer motor.

13. The transfer car according to claim 12, wherein said drive motor is mounted on said frame.

14. A conveyor system comprising:
    a plurality of supply conveyors, each having a discharge end;
    a plurality of receiving conveyors, each having a receiving end, said receiving conveyors disposed apart from said supply conveyors to define an aisleway therebetween having a length there across; and
    a transfer car including;
       a chassis;
       means associated with said chassis for propelling said transfer car in a first direction through said aisleway; and a transfer conveyor assembly mounted on said chassis including:
an article transfer component defining a transfer axis that is nonparallel with said first direction, said transfer component further defining a width along said transfer axis that is less than said length across said aisleway, said transfer component configured for receiving articles from one of said supply conveyors; and
a drive mechanism operably connected to said transfer component to reciprocate said transfer component along said transfer axis between a first position adjacent said discharge end of one of said supply conveyors and a second position adjacent said receiving end of one of said receiving conveyors.

15. The conveyor system according to claim 14, wherein said transfer conveyor assembly has a neutral position centered on said chassis providing a gap of at least six (6) inches between each of said discharge end and said receiving end while said transfer car is traveling in said first direction.

16. The transfer car according to claim 15, wherein said gap is about nine (9) inches.

\* \* \* \* \*

UNITED STATES PATENT AND TRADEMARK OFFICE
CERTIFICATE OF CORRECTION

PATENT NO.   : 6,116,842

DATED        : Sep. 12, 2000

INVENTOR(S)  : Richard D. Harris, Achie B. Russell

It is certified that error appears in the above-identified patent and that said Letters Patent is hereby corrected as shown below:

Col. 7, line 27
  replace "64"
  with --54--
Col. 7, line 45
  replace "68"
  with --58--
Col. 8, line 6
  replace "67"
  with --57--
Col. 8, line 44
  replace "26"
  with --25--
Col. 9, line 39
  replace "along the a tract"
  with --along a tract--

Signed and Sealed this

Twenty-fourth Day of April, 2001

Attest:

NICHOLAS P. GODICI

Attesting Officer         Acting Director of the United States Patent and Trademark Office